United States Patent [19]

Goulbourne

[11] Patent Number: 4,705,060
[45] Date of Patent: Nov. 10, 1987

[54] DETECTING LEAKS IN PLUMBING SYSTEMS

[76] Inventor: Stephen Goulbourne, 28 Holt House, Tulse Hill, London, United Kingdom

[21] Appl. No.: 9,693

[22] Filed: Feb. 2, 1987

[30] Foreign Application Priority Data

Aug. 1, 1986 [GB] United Kingdom ............... 8618802

[51] Int. Cl.⁴ .............................................. F17D 5/02
[52] U.S. Cl. .................................... 137/102; 137/460; 137/487.5
[58] Field of Search ..................... 137/460, 487.5, 102, 137/107; 73/40.5 R

[56] References Cited

U.S. PATENT DOCUMENTS 4,360,036 11/1982 Shelton ......................... 137/107 X
4,518,955 5/1985 Meyer ............................ 137/460 X Primary Examiner—Alan Cohan
Attorney, Agent, or Firm—Bacon & Thomas

[57] ABSTRACT

The invention provides apparatus for detecting and then dealing with a leak in a plumbing system. Flow sensor means detect any unauthorized flow of water in the system and send a signal to a microprocessor control means. The control means then activates an alarm, isolates the leaking part of the system by closing normally open valves, and then operates ejecting means for ejecting water from the leaking part of the system safely to a drain.

10 Claims, 4 Drawing Figures

DETECTING LEAKS IN PLUMBING SYSTEMS

This invention relates to apparatus for dealing with a leak in a plumbing system.

It is a problem with plumbing systems that if a leak occurs while the building is unoccupied, water will escape from the plumbing system until the leak is detected and the water supply turned off at the mains. This leaking water can cause considerable damage to the building and its furnishings. For example, if a leak were to occur in a household domestic plumbing system while the occupants were away on holiday, it could be several days before the leak is detected and the escape of water stopped.

According to the invention there is provided apparatus for dealing with a leak in a plumbing system, comprising flow sensor means for detecting any unauthorised flow of water in said plumbing system, valve means for closing down the leaking part of said system, means for ejecting water from the leaking part of said system to a drain, and control means for controlling said valve means and said ejecting means in response to a signal received from said flow sensor means.

By means of this arrangement, at least in its preferred forms, a leak is detected by the flow sensor means sensing an unauthorised flow of water. Signals are sent from the sensor means to the control means which in turn instructs the valve means to shut down the leaking part of the system and operates the ejecting means to rapidly empty water from the leaking part of the system to a drain.

Preferably the ejecting means comprises a plurality of pipelines leading to the drain, each line including a normally closed end of line valve, a pump for ejecting water to the drain when the valve is open, and a flow sensor for detecting when all the water has been ejected.

The valves of the valve means are preferably solenoid valves, although alternatively they could be motorised valves. The control means is preferably a pre-programmed microprocessor, the inputs of which accept signals from the flow sensors and the outputs of which are connected to the valves, pumps and electrical mains supply.

The apparatus may also be provided with temperature sensing means for monitoring the temperature of the water so that an alarm may be generated if the water is close to freezing and potentially damaging the pipes.

An embodiment of the invention will now be described by way of example and with reference to the accompanying drawings, in which.

Figure 1:
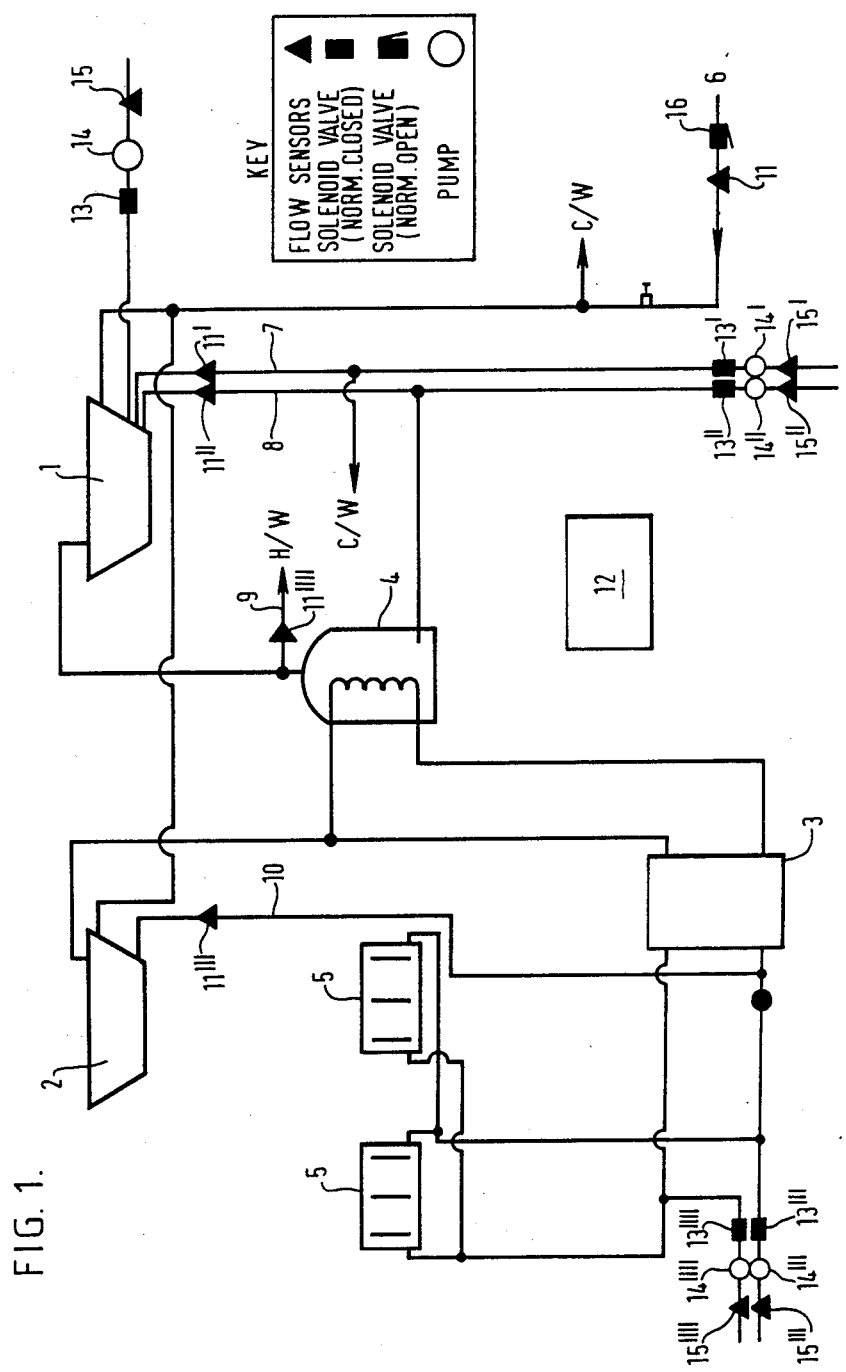
FIG. 1 is a schematic view of a plumbing system incorporating an embodiment of the present invention.

Referring firstly to FIG. 1, a plumbing system is shown including a cold water storage tank 1, a feed and expansion tank 2, boiler 3, hot water cylinder 4 and a plurality of radiators 5. Water enters the system from mains supply 6 and is fed to the cold water storage tank 1, and the feed and expansion tank 2. Two downpipes 7, 8 lead from the cold water tank; a first downpipe 7 goes to the bathroom and toilet, a second downpipe 8 leads to the base of the hot water tank 4. Hot water is drawn off from the top of the hot water tank by pipe 9.

The boiler 3 is fed by a down pipe 10 from the feed and expansion tank 2 and in turn supplies the radiators 5 and hot water cylinder 4 with hot water. As so far described the plumbing system is conventional.

In order to detect leaks in the system, the system is provided with a plurality of flow sensors 11 at selected locations. In the embodiment shown flow sensors are provided in the mains supply, and in the down pipes from the cold water tank and the feed and expansion tank. The flow sensors may be of any conventional type, but it is preferred that certain requirements are met. The flow sensors should preferably have a low working pressure drop so as to not affect the normal working of the system. The sensors should also be manufactured from materials that will not contaminate drinking water.

The flow sensors are preferably constructed by providing a flow sensitive element within a suitable enclosure to allow for fitting into a pipe line to form an effective seal. One such method of achieving this is to mount an impellor in the water stream, the impellor carrying a multipole magnet, the movement of which can be detected by an inductive sensor external of the pipe.

It will be clear however that many other methods of detecting flow are possible; e.g. a nutating disc, ocillating piston, turbine blade, vortex shedding from a stationary body or by doppler or time of flight ultrasonic means. Again other possibilities for detecting movement of a flow sensing device can be achieved by reflective and interrupted optical means, Hall effect switches and capacitative sensors.

When a leak occurs in the system, an unauthorised flow will be detected by the sensors which will send a signal to the control means as will be described below. Of course, the flow sensors will be arranged so as to not respond to a small flow, such as would be caused by a dripping tap, but only when a predetermined flow rate is exceeded.

The whole system is controlled by control means in the form of a microprocessor 12. The microprocessor accepts the signals from the flow sensors 11 as input signals and, in turn, controls the operation of solenoid valves 13, 16 and pumps 14, in a manner to be described below. In addition the microprocessor is capable of switching off the electricity mains supply to the boiler if necessary.

In the event of a leak in the system a flow of water will be detected by the flow sensor 11 in the incoming mains supply and by one of the other flow sensors in the leaking part of the system.

For example, if a leak occurs in the cold water down pipe 8, flow will also be detected by sensor 11". Flow sensors 11 and 11" will send signals to microprocessor 12 which will instruct normally open valve 16 to shut down to prevent any further supply of water to the system. The microprocessor will also switch off the supply of electricity to the boiler and cylinder. The microprocessor will then open normally closed end of line valves 13, 13' and 13" and activate pumps 14, 14' and 14" which will act to empty the cold water storage tank, cylinder and pipework of water by ejecting the water to a drain. By thus ejecting the water from the leaking part of the system to a drain, the possibility of damage being caused by leaking water is minimised. When all the water has been ejected flow sensors 15, 15' and 15" associated with pumps 14, 14' and 14" will detect no flow and instruct the microprocessor to switch off the pumps to prevent damage to the pumps.

In the event of a leak occurring in the heating side of the system, this will be detected by sensor 11''' detecting unauthorised flow together with sensor 11. As before, the microprocessor 12, in response to signals from the sensors 11 and 11''' will shut solenoid valve 16 to switch off the mains water supply. In addition the microprocessor control will switch off the electricity supply to the boiler and cylinder and will open normally closed end of line valves 13''' and 13'''' and operate their associated pumps 14''', 14'''' so as to eject water from the feed and expansion tank, radiators, boiler and all associated pipework. Once again the flow sensors 15''', 15'''' associated with these pumps will detect no further flow when all the water has been ejected and cause the microprocessor control to switch off the pumps.

A further flow sensor 11'''' may be provided if desired in the hot water draw off pipe 9 which would detect a leak in the hot water system.

Figure 2:
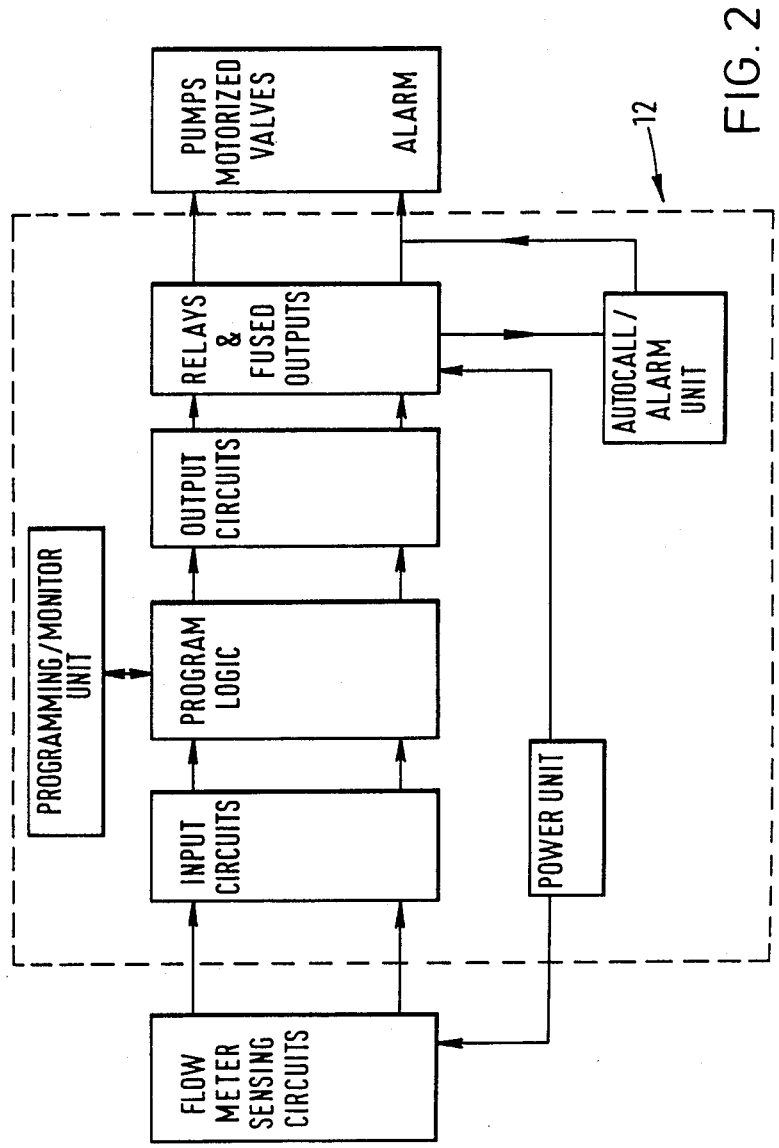
FIG. 2 is a block diagram of the control means.

The structure of the microprocessor control means is shown schematically in FIG. 2. The flow sensors 11 provide signals which are fed to the inputs of the microprocessor. In response to these signals, and in accordance with pre-programmed logic, the microprocessor produces output signals which operate relays so as to switch on and off the pumps, solenoid valves and electricity supply as required. In addition the control means may be designed so as to automatically generate an alarm when a leak occurs. Such an alarm is preferably achieved by the microprocessor calling a predetermined telephone number and giving an appropriate message. Thus a plumber may be called in to repair the system automatically in the event of a leak. The control means may also have a LED display that will indicate where the leak has occurred so as to facilitate repair.

Figure 3:
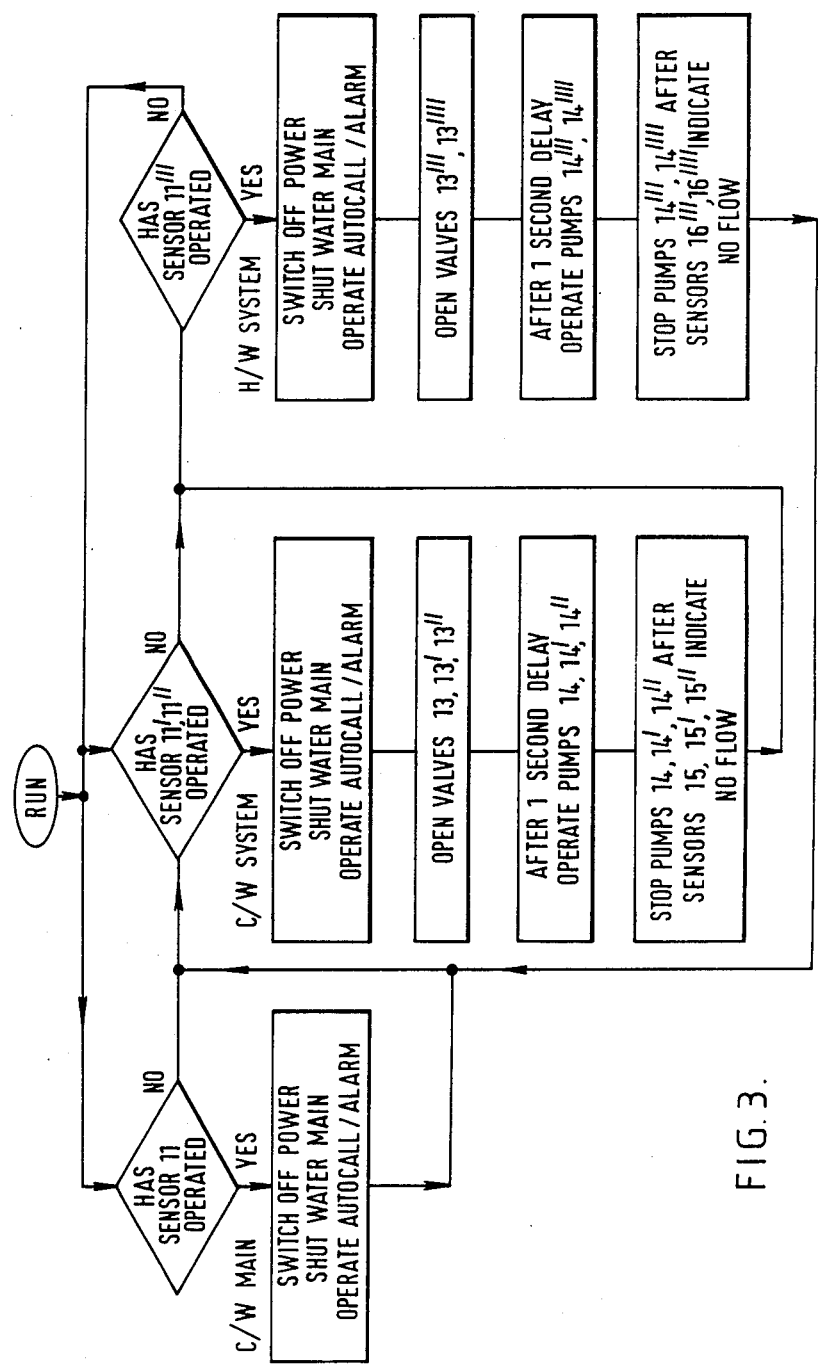
FIG. 3 is a flow diagram showing the operation of the control means.

The programme logic of the microprocessor control means is shown in FIG. 3 as a flow diagram.

The flow diagram has three main sections, corresponding to leaks in the cold water main, cold water down service, and heating system respectively. The first question asked by the programme is whether or not sensor 11 has been activated. If the answer is 'yes', then the power is switched off, water main shut off and the alarm activated. The next question is whether or not sensors 11'', or 11' have been activated, indicating a leak in the cold supply; if so the control processor shuts off the power and the water main and opens valves 13, 13', 13'' and activates pumps 14, 14', 14'' to eject water from the cold water system. The final question is whether or not sensor 11''' has been activated indicating a leak in the central heating system. If the answer is 'yes', then once again the power and mains supply are switched off, valves 13''' and 13'''' opened and water is ejected from the heating system. The programme then returns to the beginning and is repeated.

Although sensor 11, on the incoming mains supply, will always register a leak, if the leak is in the cold water down service or the heating system, the leak will be detected first by the sensors 11', 11'' or 11''' respectively before the sensor 11 and so it is possible that the answer to the first question could be 'no' before a 'yes' is received to one of the other questions. In such a case, the question 'Has sensor 11 operated?' would be answered in the affirmative when the programme repeats through the loop. Furthermore it will be appreciated that if there are several leaks in the system the answer 'yes' may be given to any two or even all three questions.

Figure 4:
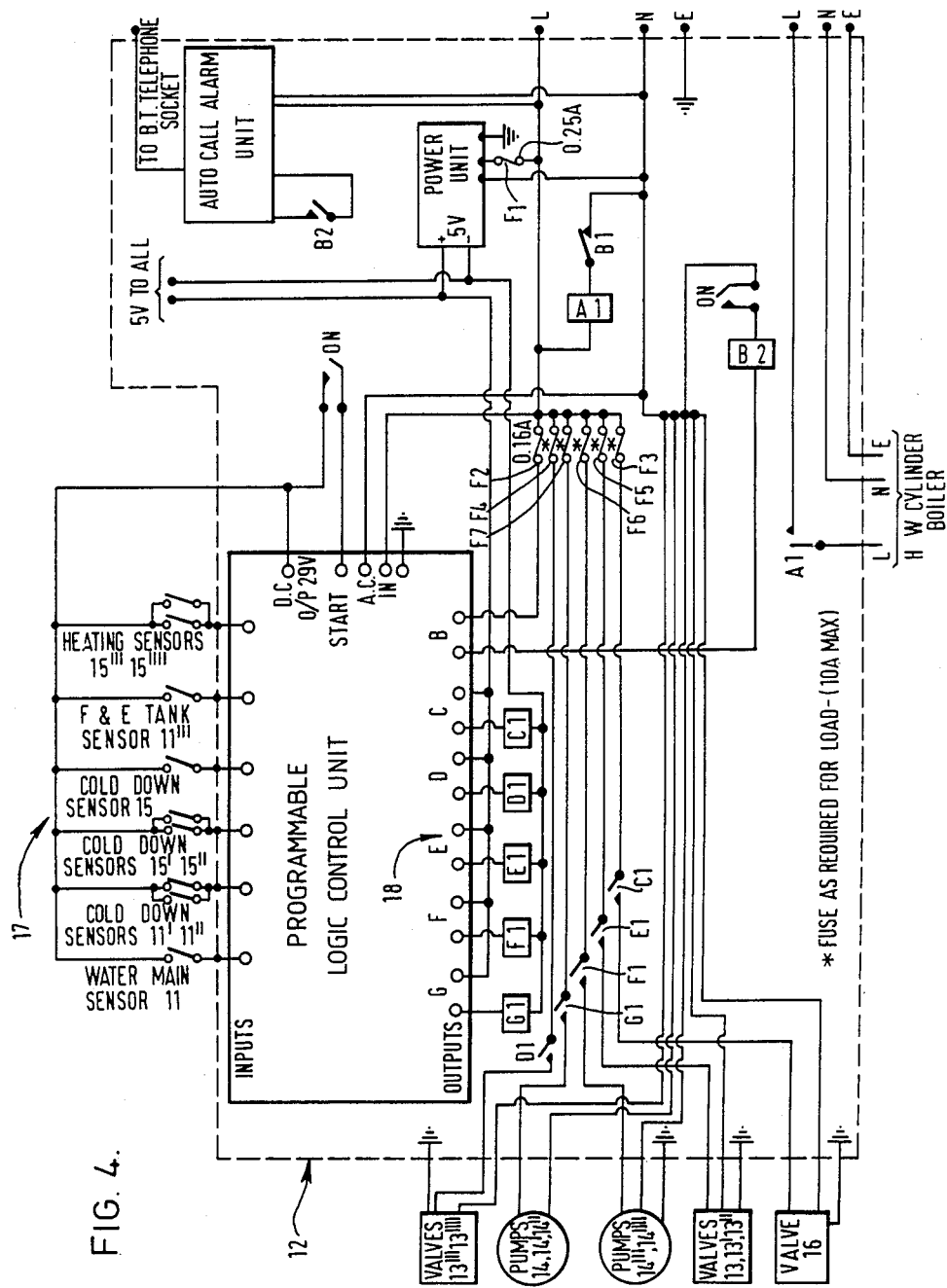
FIG. 4 is a circuit diagram showing the control means.

The microprocessor control is shown in more detail in FIG. 4. In the embodiment shown the microprocessor has six inputs 17 associated with the various sensors, however it will be appreciated that the capacity of the microprocessor may be increased if the apparatus is applied to a larger plumbing system requiring a larger number of sensors. A first input is associated with the incoming mains sensor 11, the second with the two cold down sensors 11', 11'', a third with cold down end-of-line sensors 15', 15'', a fourth with end-of-line sensor 15, a fifth with feed and expansion tank sensor 11'''' and a sixth with end-of-line sensors 15''', 15'''' of the heating system. When any of these sensors detect a flow of water, an input signal is received by the microprocessor. The microprocessor is thus able to monitor the status of each flow sensor and thus of the system as a whole. The microprocessor is pre-programmed to produce given output signals in response to the input signals. In particular the microprocessor has six outputs 18, (B, C, D, E, F, G.) Each output has an associated relay (B1, C1 etc) which controls the solenoid valves, pumps etc. For example, if output E is in a positive state, relay E1 is switched operating valves 13, 13', 13''. Similarly output F controls pumps 14''', 14''''; output G controls pumps 14, 14', 14''; output D controls valves 13''', 13''''; and output C controls valve 16. Output B controls the electricity supply to the cylinder and boiler via relays B1, A1 and also controls the automatic alarm via relay B2.

The microprocessor may be preprogrammed with the logic of FIG. 3 so that the pumps and valves etc may be controlled by the output circuits in response to the inputs received from the flow sensors in the manner described.

In one embodiment the apparatus may also be provided with temperature sensing means, preferably incorporated within the flow sensors. The sensing means may be any suitable electronic temperature gauge, such as a platinum resistance thermometer for example, which may be attached to the flow sensor by means of a threaded insert. The function of these temperature sensors is to continuously monitor the temperature of the water in the system and to generate an alarm if the temperature falls close to freezing. The temperature sensors are connected to the master control panel via a low voltage cable and in the event that the water temperature falls below 1° C. a signal is sent to the control panel. On receipt of such a signal an alarm on the master control panel would be activated and a pre-recorded telephone message would be sent. In this way advance warning would be given that the water in the plumbing system was dangerously close to freezing, with the likelihood of damage being caused to the pipework.

It is to be clearly understood that there are no particular features of the foregoing specification, or of any claims appended hereto, which are at present regarded as being essential to the performance of the of the present invention, and that any one or more of such features or combinations thereof may therefore be included in, added to, omitted from or deleted from any of such claims if and when amended during the prosecution of this application or in the filing or prosecution of this application or in the filing or prosecution of any divisional application based thereon.

I claim:

1. Apparatus for dealing with a leak in a plumbing system, comprising flow sensor means for detecting any unauthorised flow of water in said plumbing system, valve means for closing down the leaking part of said system, means for ejecting water from the leaking part of said system to a drain, and control means for controlling said valve means and said ejecting means in response to a signal received from said flow sensor means.

2. Apparatus according to claim 1 wherein said ejecting means comprises a plurality of pipelines leading to the drain, each line including a normally closed end of line valve, a pump for ejecting water to the drain when the valve is open, and a flow sensor for detecting when all the water has been ejected.

3. Apparatus according to claim 1 wherein said flow sensor means comprises a plurality of flow sensors at selected locations in said system.

4. Apparatus according to claim 3 wherein each said flow sensor comprises an impellor mounted in the water stream and carrying a magnet, the movement of which can be detected by an inductive sensor external of the pipe.

5. Apparatus according to claim 1 wherein said control means comprises a pre-programmed microprocessor.

6. Apparatus according to claim 5 wherein the inputs of said microprocessor are connected to said flow sensor means, and wherein the outputs of said microprocessor control the valve means and ejecting means.

7. Apparatus according to claim 5 wherein in the event of a leak being detected by said flow sensor means, and a signal being received by said microprocessor, said microprocessor control means activates an alarm by automatically dialling a selected telephone number and transmitting a prerecorded message.

8. Apparatus according to claim 1 wherein the valves of said valve means are solenoid valves.

9. Apparatus according to claim 2 wherein said end-of-line valves are solenoid valves.

10. Apparatus according to claim 1 further comprising temperature sensing means for monitoring the temperature of the water in the system, said temperature sensing means being adapted to send a signal to said control means when the temperature of the water falls below a predetermined level.

* * * * *